(No Model.)  9 Sheets—Sheet 1.

B. C. BATCHELLER.
PNEUMATIC DESPATCH TUBE SYSTEM.

No. 595,755.  Patented Dec. 21, 1897.

Fig. 1.

Attest:
H. H. Schott
J. A. Saul

Inventor
Birney C. Batcheller
per Fred W. Tasker, Atty.

(No Model.) 9 Sheets—Sheet 3.

B. C. BATCHELLER.
PNEUMATIC DESPATCH TUBE SYSTEM.

No. 595,755. Patented Dec. 21, 1897.

Fig. 3.

Attest:
F. H. Schott
J. A. Saul

Inventor
Birney C. Batcheller,
per Fred. W. Packer.
Atty.

(No Model.) 9 Sheets—Sheet 4.

B. C. BATCHELLER.
PNEUMATIC DESPATCH TUBE SYSTEM.

No. 595,755. Patented Dec. 21, 1897.

Attest:
F. H. Schott
L. A. Saul

Inventor:
Birney C. Batcheller
per Fred'k C. Askew
Atty.

(No Model.) 9 Sheets—Sheet 5.

B. C. BATCHELLER.
PNEUMATIC DESPATCH TUBE SYSTEM.

No. 595,755. Patented Dec. 21, 1897.

Fig. 5.

Attest:
F. H. Schott
J. A. Paul

Inventor
Binney C. Batcheller
per Fred'k W. Tasker,
Atty.

(No Model.) 9 Sheets—Sheet 6.

B. C. BATCHELLER.
PNEUMATIC DESPATCH TUBE SYSTEM.

No. 595,755. Patented Dec. 21, 1897.

Attest:
F. H. Schott
J. A. Saul

Inventor
Birney C. Batcheller
per Fred E. Tasker,
Atty.

(No Model.) 9 Sheets—Sheet 7.

B. C. BATCHELLER.
PNEUMATIC DESPATCH TUBE SYSTEM.

No. 595,755. Patented Dec. 21, 1897.

(No Model.) 9 Sheets—Sheet 9.

B. C. BATCHELLER.
PNEUMATIC DESPATCH TUBE SYSTEM.

No. 595,755. Patented Dec. 21, 1897.

Attest:
F. H. Schott
J. A. Paul

Inventor:
Birney C. Batcheller
per Theo. B. Asker
Atty.

UNITED STATES PATENT OFFICE.

BIRNEY C. BATCHELLER, OF NEW YORK, N. Y., ASSIGNOR TO THE UNITED STATES MAIL PACKAGE AND GENERAL PNEUMATIC DELIVERY COMPANY, OF PHILADELPHIA, PENNSYLVANIA.

PNEUMATIC-DESPATCH-TUBE SYSTEM.

SPECIFICATION forming part of Letters Patent No. 595,755, dated December 21, 1897.

Application filed September 8, 1896. Serial No. 605,086. (No model.)

*To all whom it may concern.*

Be it known that I, BIRNEY C. BATCHELLER, a citizen of the United States, residing at New York, in the county of New York and State of New York, have invented certain new and useful Improvements in Pneumatic-Despatch-Tube Systems; and I do hereby declare the following to be a full, clear, and exact description of the invention, such as will enable others skilled in the art to which it appertains to make and use the same.

The object of my invention is to provide an improved system for the pneumatic transmission of packages, mail-matter, &c., in which carriers transmitted from one to another of a series of stations located upon the same or different lines are delivered at the proper stations by a simple and durable and automatic mechanism, and principally it is my aim to avoid the destructive shocks as well as other well-recognized defects incident to systems and appliances heretofore used in which a carrier moving at speed is made to actuate a trip or set in motion mechanism for switching itself from one line to another or from a delivery-line to a discharge-opening.

The leading features of my invention consist, first, in providing, in connection with tripping or selecting devices arranged in the path of and to be operated by a carrier, mechanism for checking the motion of the carrier placed in advance of such trips or selecting mechanism and arranged to check the motion and take up the momentum of the carrier before it comes in contact with the selecting mechanism.

The second leading feature of my invention consists in providing, in connection with a delivery-tube and two or more receiving or discharging tubes or openings, a transfer-tube movable to register with each tube in turn and arranged, when in registry with the delivery-tube, to check and stop the motion of the carrier and then to transport it, while relatively stationary, to pass into a position of registry with a receiving or discharging tube or opening.

In connection with these two leading features of my invention I have devised many appliances for the practice thereof in automatic and commercially practicable apparatus, all of which will be best understood as described in connection with the drawings.

Referring to the accompanying drawings.

Figure 1:
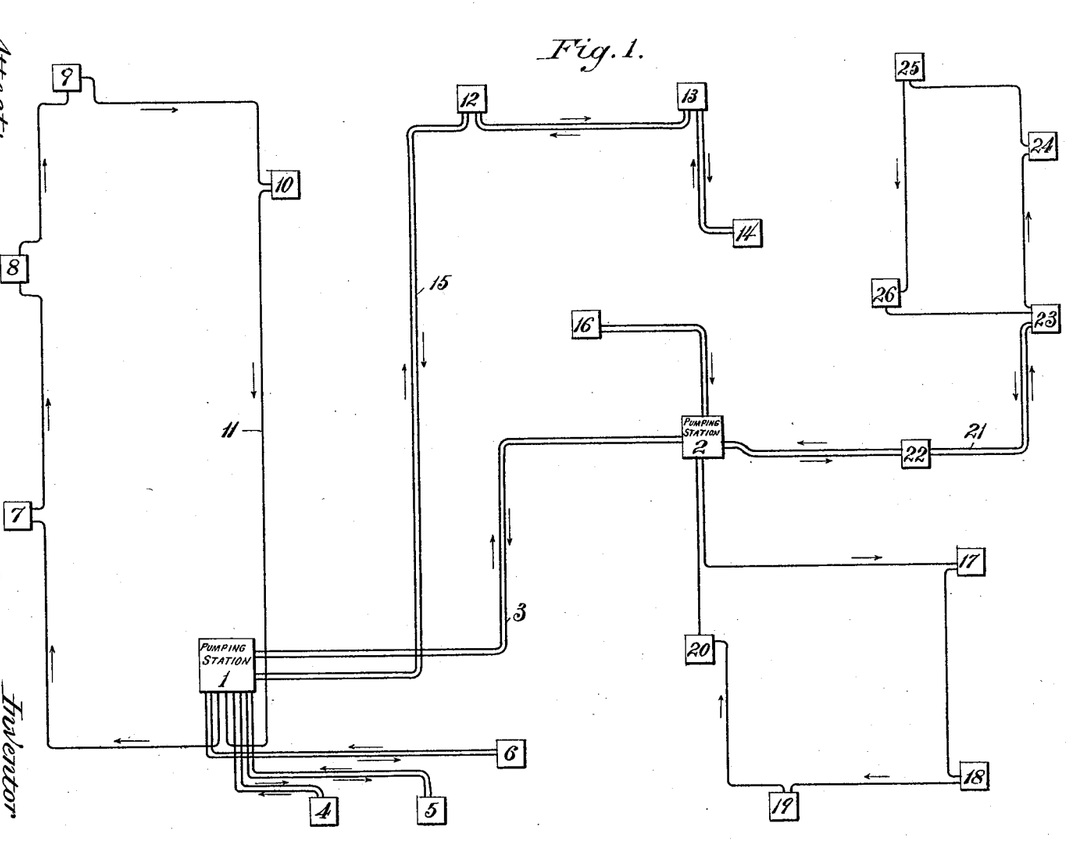
Figure 1 is a diagrammatical view illustrating my system of pneumatic transmission.

Referring to the figures on the drawings, 1 and 2 indicate central stations, and 3 a communicating "trunk-line," which term I shall employ in the designation of any line between two or more stations which consists of a double line of tubes through which the carriers pass in opposite directions.

4, 5, and 6 indicate substations, which may represent stores—for instance, in the central part of the city—from which it is desired to deliver packages to substations situated in the resident portion of the city. Such latter substations 7, 8, 9, and 10 are located upon what I will designate a "loop-circuit" 11, by which term I mean a circuit in which substations are so placed that the tube leading from the central station passes into and out of the stations successively.

12, 13, and 14 indicate substations located upon a trunk-line 15 in communication with the central station 1. 16 indicates a substation located on a similar line, but communicating with central station 2.

17, 18, 19, and 20 indicate substations upon a loop-circuit communicating with station 2.

21 indicates a combination trunk-line and loop-circuit, the tubes of the trunk-line portion extending from the station 2 through the substation 22 to the substation 23, from which point the line is looped and has located upon it, in a manner similar to the stations upon the circuit 11, substations 24, 25, and 26.

The stations 4, 5, and 6 being in communication with the central station 1, as by trunk-lines, packages to be transmitted to any sub-station are sent to the central station 1. Supposing the destination of the parcel in question is substation 9, it is placed in a carrier and the operator at the central station so adjusts the carrier or mechanism carried by it, hereinafter to be described, that it will pass through stations 7 and 8 without effecting the discharge mechanism at such stations, but will automatically trip the discharge mechanism at the station for which it is intended.

It will be observed that in the loop-circuit it is necessary for the carrier to pass around the entire circuit if it is destined for the last station—as, for instance, 10—and that it cannot be transmitted from one station to another without proceeding in the general direction of the air-current. For instance, a package could not be transmitted from station 10 to station 9 without passing entirely around the circuit by way of the central station and the stations 7 and 8. Such an arrangement, however, is adequate under ordinary conditions, but for the purpose of accommodating a comparatively large amount of business I have devised the trunk-line system.

It will be observed that the stations 12, 13, and 14, for instance, are connected one with the other and with the station 1 by direct and return tubes, and while it is necessary for a carrier destined for station 14 to pass through the preceding stations the transmission of a carrier between the substations is possible without necessitating its passage around the entire circuit.

The combined trunk-line and loop-circuit 21 is designed for use where a number of stores or similar stations are desired to be connected to the central station by a trunk-line and to a number of outlying, comparatively unimportant intermediate stations by a loop-circuit.

The direction of movement of the carriers in the two parts of the circuit 21 is identical with the movement of the carrier described in connection with circuit 11 and trunk-line 15.

A distinguishing feature of my system is the absence of branch lines connected with the main lines by switches, all of the stations in my system being located upon a line or circuit complete in itself, provision being made for the practically-uninterrupted passage of the carrier through a wayside station to its destination, where it is automatically stopped and discharged. It is evident, however, as illustrated in Fig. 1, that a number of circuits may be in communication with a common or central station where the carrier may be transferred from one circuit to another in the same manner as it is transferred from one section to another of the same system.

The foregoing description refers solely to Fig. 1 and relates to my system as a whole, and I shall now proceed to a description of the apparatus located in each station, which embodies carrier receiving, discharging, and transferring mechanism designed to be automatically operated by the carrier to either discharge it or transfer it to the tube leading from the station.

27 indicates a preferably circular casing carried upon a base-plate 28 by suitable supporting-standards 29 and connected at points, preferably at an angle with respect to each other, with pneumatic tubes 30 and 31, leading, respectively, into and out of the station, and which, with reference to each station, may be called, respectively, "delivery" and "receiving" tubes.

The casing 27 consists of two annular side plates 32 and an intermediate cylindrical collar 33 at the inner peripheries of the plates 32 and an outer curved plate 34, extending approximately around one-half of the casing, the collar 33 and plate 34, together with the side plates 32, constituting air-channels 35 and 36, leading from the tube 30 to the tube 31 and from the tube 30 to a point diametrically opposite to the tube 31, at which point the plate 34 is bulged and extended to the collar 33, with which it may be integral, as illustrated.

The collar 33 is provided at 37, 38, 39, and 40 with apertures corresponding in diameter with the interior diameter of the pneumatic tube, the apertures 37 and 39 and 38 and 40 being diametrically opposite each other. 41 indicates a similar opening in the collar 33 intermediate of the openings 39 and 40, from which extends, preferably at an angle of about forty-five degrees, a discharge-chute 42, diametrically opposite to which the collar 33 is provided with a comparatively small opening 43, controlled by a valve 44, the stem 45 of which projects from the plate 34 and is adjustably carried by a bracket 46, carried thereon. An ordinary gland 47 may be employed in order to secure an air-tight bearing around the valve-stem 45.

48 indicates bearing-brackets carried upon the side plates 32, secured thereto, as by bolts 49, and provided with bearings 50, concentric with the side plate, in which are journaled the trunnions 51 of what I will call a "transfer-frame" 52, consisting of circular side plates 53 and a peripheral cylindrical plate 54, fitting closely within the collar 33.

55 indicates what I will term the "transfer-tube," extending diametrically across the transfer-frame and preferably integral with the plate 54, which latter is pierced by apertures 56, correlative with the interior diameter of the tube.

57 and 58 indicate slotted thimbles extending across the casing between the tube connections and the apertures 37 and 40 for the purpose of guiding a carrier from the tubes of the system to the receiving-tube of the apparatus, or vice versa, the slots 59 in the thimbles permitting the air to flow freely from the system-tubes through the air-passages 35 and 36 and transfer-tube 55 in a manner to be described.

Packing-rings 60, encircling each of the apertures 37, 38, 39, and 40 and abutting against the transfer-frame, are desirable in order to make a tight joint between the frame and casing.

The mechanism thus far described constitutes a simple embodiment of my invention, and the elements enumerated might without addition prove effective in some instances.

The operation of such an apparatus is as follows: The transfer-tube being in the position indicated in Fig. 4 of the drawings, the aperture 39 being closed by any suitable means, and the escape of air from the bottom of the tube being provided for, a carrier of any suitable construction is projected from the tube 30 into the transfer-tube 55 by pneumatic pressure, the air in front of the carrier forming an air-cushion at the bottom of the receiving-tube, designed to overcome the shock incident to the arrival of the carrier and to be permitted to escape and allow the carrier to gradually come to rest. According to whether it is desired to discharge the carrier or to transfer it to the pipe 31, which may be a continuation of the same or an independent system, the transfer-frame is now rotated so as to bring the transfer-tube in alinement with either the discharge-opening 41 or the opening 40, leading to the tube 31. If the former, the compressed air from the tube 30 passes through the slots 59 into the air-passage 36 and through the valve-opening 43 into the receiving-tube behind the carrier, discharging it into the discharge-chute 42. If it is not desired, however, to discharge the carrier, but to simply transfer it, the transfer-frame is rotated until the tube assumes the position indicated by dotted lines in Fig. 5, the air in this instance passing from the air-passage 36 through the opening 38 into the transfer-tube to project the carrier through the opening 40, the passage 35 in this position of the apparatus being closed by a suitable valve. It is obvious that the rotation of the transfer-frame might be accomplished by any suitable means, either mechanical or manual.

While, as has been remarked, such an apparatus might be effective, I have proceeded further in the development of my invention and have provided means for causing the carrier to automatically effect its discharge or transfer according to the predetermination of the sender. To this end 61 indicates what I will call the "transfer-frame cylinder," supported upon the base-plate 28 and provided with a piston 62, the rod 63 of which is connected to a cross-head 64, movable upon suitable ways 65, carried by brackets 66, preferably supported upon the head of the cylinder.

67 indicates a pitman connected at its opposite ends to one of the side plates of the transfer-frame and to the cross-head, respectively, the movement of the pitman being designed to rotate the transfer-frame through forty-five degrees or ninety degrees, as the case may be, for the purpose of bringing the transfer-tube opposite the opening 41 or 40.

68 indicates the valve-chest of the transfer-frame cylinder, provided with the usual ports and with a sliding valve 69, connected at its upper end with the extremity of a valve-actuating lever 70, provided with an armature 71 in juxtaposition to a magnet 72.

Figures 11, 13, 14:
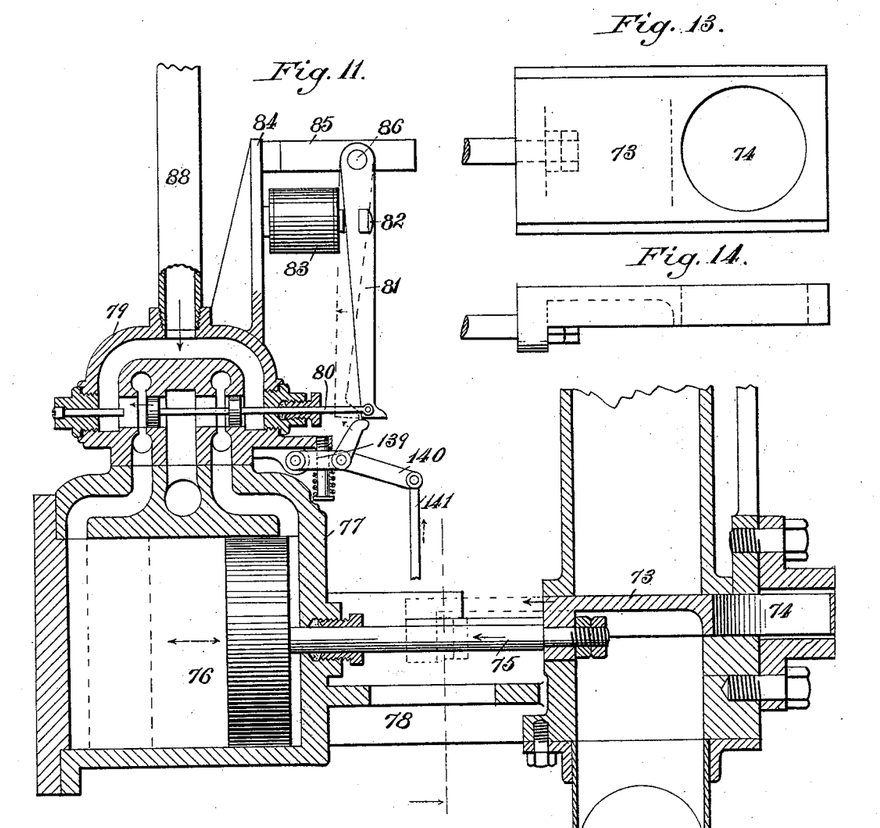
Fig. 11 is a sectional view through the discharge-gate cylinder and discharging-gate, showing parts of contiguous elements.
Figs. 13 and 14 are detail views of the discharge-gate.
Figure 12:
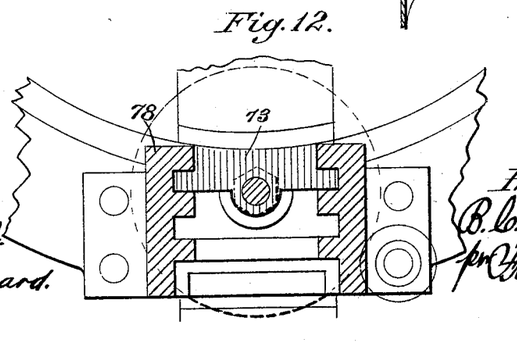
Fig. 12 is a sectional view through the discharge-gate-cylinder support and discharge-gate.

73 indicates a discharge-gate controlling the discharge-opening 41, provided (see Figs. 11 to 14) with an opening 74 and connected by any suitable means—as, for example, that illustrated in Fig. 11—with the piston-rod 75, carried by the piston 76 within the discharge-gate cylinder 77. The cylinder 77 is supported upon the casing, as by a supporting-frame 78, which serves as a slide-bearing for the gate 73. (See Figs. 11 and 12.) The cylinder 77 is provided with a valve-chest 79, similar to the valve-chest 68, and with a valve-stem 80, connected with a valve-actuating lever 81, similar to the lever 70, and provided like said lever with an armature 82 in juxtaposition to the magnet 83, carried by a bracket 84, which likewise supports the standard 85, to which the lever 81 is pivoted, as at 86. (See Fig. 11.)

The valve-chests 68 and 79 communicate, respectively, with supply-pipes 87 and 88, through which pneumatic pressure may be supplied to the cylinders either from the pneumatic system or from any suitable source, or it may be preferable in some instances to supply these cylinders with other than pneumatic pressure.

As it has been premised that the operation of the entire apparatus is automatic, I will now proceed to a description of the mechanism through which the carrier operates the cylinder-valves to automatically cause the rotation of the transfer-frame and the opening of the discharge-gate at the proper time.

89 indicates a depending collar encircling the aperture 39 in the collar 33 of the casing, in which depending collar is telescoped a cylindrical shell 90, secured thereto, as by bolts 91, and provided with a double head 92, the sections of which are pierced by apertures 93 and 94, of different diameters, but located in axial alinement, the apertures 93 being provided with insulation 95 for a purpose to be made apparent.

96 indicates what I will call the "needle-supporting tube," having a head 97, within which are secured needle-casings 98, provided with insulating-linings 99, and having their opposite ends closed with the exception of comparatively small axial apertures 100 for the accommodation of contact-needles 101 and 101$^a$, normally projecting into the receiving-tube and retained in the elevated position by spiral springs 102, intermediate of the lower ends of the needle-casings and of disks 103, secured to the needles. The needle-supporting tube depends and extends through the diaphragm 104 in the shell, being screwed at its opposite extremity into a piston 105, movable within a cylinder 106, comprehended between the diaphragm 104 and a head 107, provided with a central perforation 108. The piston 105 is retained normally in its uppermost position by any suitable means—as, for instance, a spring 109 intermediate of it and the head 107.

110 indicates a contact-spring carried by the needle-supporting tube and insulated therefrom, and 111 indicates a wire in electrical connection with the spring 110 and with the magnet 72, designed to actuate the valve-actuating lever 70. 112 indicates a similar wire in electrical connection with the magnet 72 and with the needle 101.

It will be seen that when the needle 101 is depressed by the dropping of the carrier to the bottom of the receiving-tube its lower extremity will make electrical connection with the spring 110, thereby causing the circuit to be closed, the valve in the valve-chest 68 to be opened, and the piston 62 to be actuated to rotate the transfer-frame.

It should be observed that the needle 101 is located coaxially or nearly so with the aperture 39, the reason for this being that it is desired that the transfer-circuit just described be closed upon the arrival of any carrier, whether its destination is the present station or one located beyond.

113 indicates a third wire in electrical connection with the needle 101$^a$ and with the magnet 83, a wire 114 connecting the magnet 83 with the wire 112. It will thus be seen that two distinct circuits are provided, the wire 112 being common to both, and I shall designate the second circuit, which requires contact between the two needles to close it, the "discharge-circuit."

It will now be observed that if the needles are only depressed the transfer-circuit will be closed and the transfer-frame rotated in the manner described; but if contact is made between the two needles simultaneously with the depression of the needles both circuits will be closed, and hence the discharge-gate will be opened through the action of the piston 76, the closing of the electrical circuits just described causing the magnetization of the magnet and the opening of the controlling-valves of the transfer-frame cylinder and discharge-gate cylinder through the valve-actuating levers.

The needles 101$^a$ are located at different distances from the needles 101 in the device at the different stations, inasmuch as the carriers are intended to be provided with mechanism which will make contact between two needles at a particular station and not at any other, it being obvious that when a disk on the front of the carrier strikes only the needle 101 it will simply be transferred from the tube 30 to the tube 31, but that when contact is made between the needles the discharge-gate will be opened and the carrier discharged at that station.

After the needles have performed their functions in connection with the carrier it is necessary that they be withdrawn, in order that they may not impede the movement of the transfer-frame when it is rotated, and for this purpose I provide a pipe connection 115 at one side of the shell 90 and a port 116 leading therefrom through an enlargement in the diaphragm 104 into the cylinder 106 above the piston 105.

The connection 115 is connected, as by a pipe 117, with the valve-chest 68 in a manner to cause the piston-actuating fluid to be admitted to the cylinder 106 simultaneously with its admission to the cylinder 61, and by reason of the comparatively low pressure required to actuate the piston 105 said piston will be reciprocated immediately before the movement of the piston 62, thereby causing the needles to be withdrawn from the receiving-tube immediately preceding the rotation of the transfer-frame.

Figures 6, 7, 8, 9, 10:
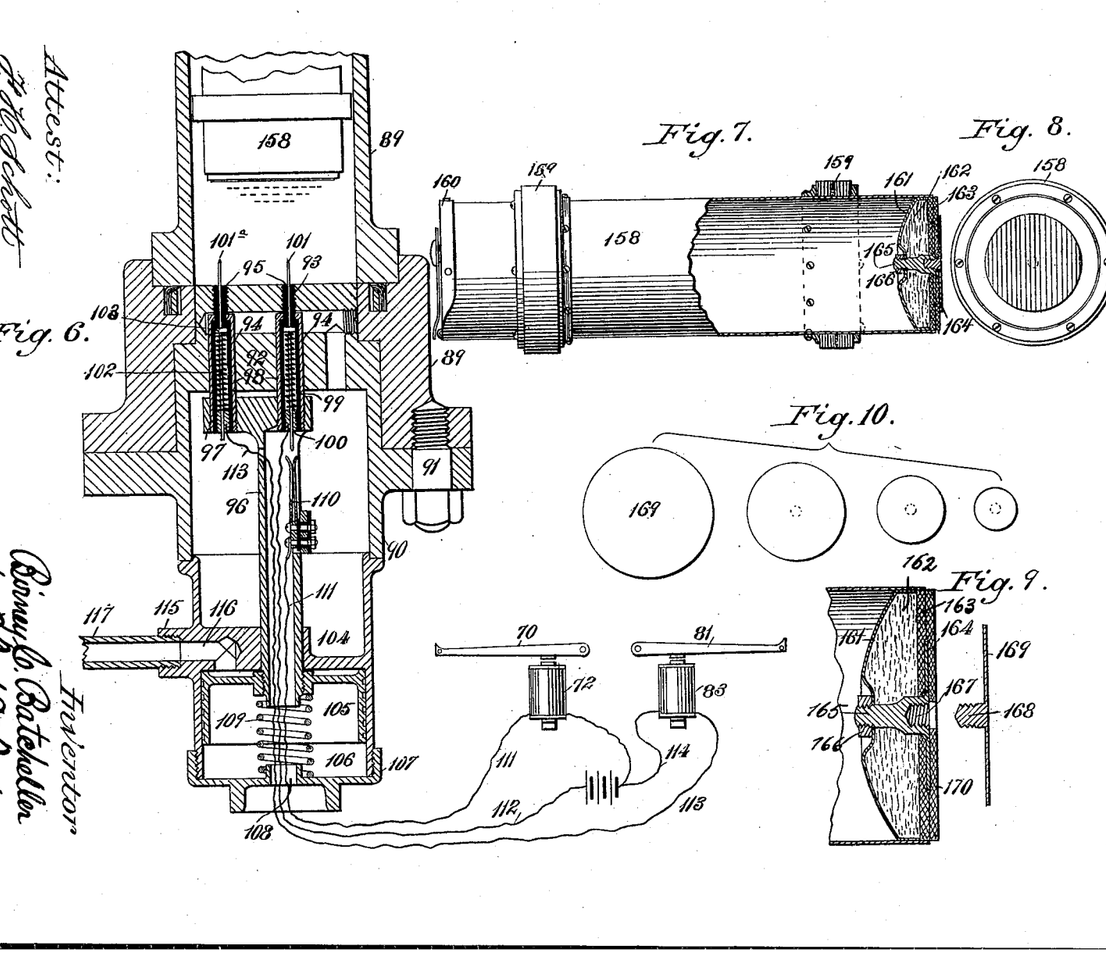
Fig. 6 is a sectional view of the lower end of the receiving-tube and electrical valve actuating or tripping mechanism.
Fig. 7 is an elevation, partly in section, of one of the carriers.
Fig. 8 is an end elevation of the same.
Fig. 9 is a section, on an enlarged scale, through the head of the carrier and showing the contact-disk detached.
Fig. 10 is a group of graduated contact-disks.

As soon as the pressure from the pistons 62 and 105 is removed in the manner to be explained the piston 105 and the needle-supporting tube will be elevated to its normal position by the spring 109 causing a compression of the springs 102, which as soon as the receiving-tube is again in its normal position will restore the needles to the position shown in Fig. 6.

Any suitable means may be employed for bringing the transfer-frame to a stop in line with the discharge-gate when a discharge of the carrier is to be effected, the means shown being the lug 118 upon the side of the transfer-frame, which will impinge against the gate when in the open position and prevent further rotation of the frame. While it would be possible, as suggested, to provide a small opening in the lower end of the receiving-tube to permit the gradual dissipation of the air which constitutes an air-cushion in front of the carrier, I prefer to prevent even this slight waste of pneumatic energy, and for this purpose provide an escape-pipe 119, leading from an aperture 120 at the bottom of the receiving-tube to an aperture 121 in the cylindrical plate 54 of the transfer-frame, so located that when the receiving-tube is in the position to receive the carrier from the tube 30 the aperture 121 will be opposite the aperture 40, leading to the tube 31.

Figures 4, 20:
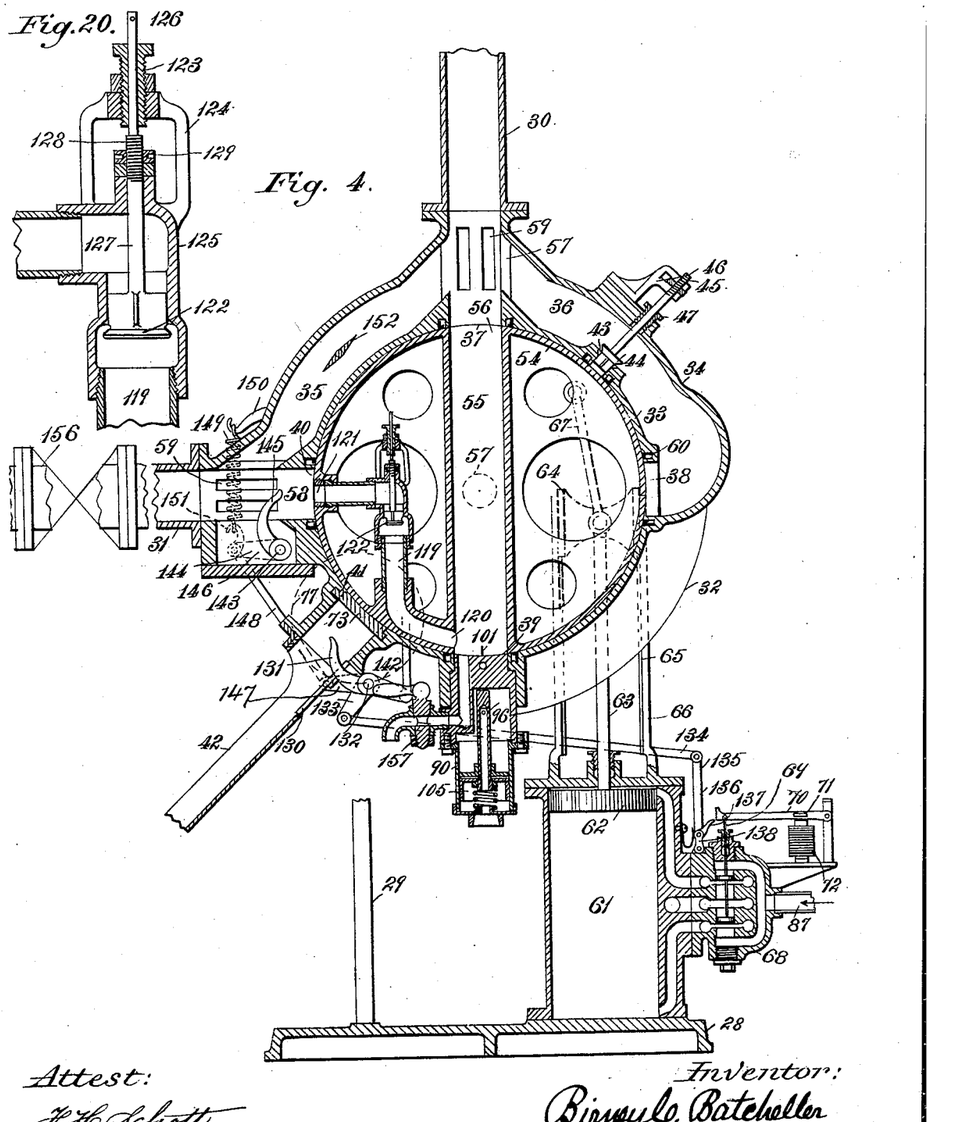
Fig. 4 is a central vertical section, of the same.
Fig. 20 is a sectional view, on an enlarged scale, of the cushion-valve and its casing.

122 indicates an adjustable gravity-valve in the pipe 119, the adjustment of which may be accomplished in any well-known manner, the means illustrated for accomplishing this adjustment consisting of a gland 123, Fig. 20, supported by a bracket 124, extending above the valve-casing 125 and receiving the reduced end 126 of the valve-stem 127, the enlarged part of which is screw-threaded, as at 128, intermediate of the casing and gland and provided with an adjustable nut 129, screwed thereon. When the carrier is precipitated into the receiving-tube, the air in front of it will be gradually compressed, forming an effective air-cushion, the tendency of the air to escape through the escape-tube 119 being opposed by the valve 122, which will be forced upward toward its seat by the air-pressure behind it to an extent determined by the adjustment of the valve 122, which adjustment is accomplished by the manipulation of the gland 123 and the nut 129. As the air gradually escapes from the receiving-tube the carrier will be brought to rest without jar and will actuate the needles to close one or both circuits as it is desired to discharge or transfer the carrier.

In so far as the initial operation of the apparatus is concerned the mechanism described is complete, but in order that a repetition of the initial operation may be automatically effected it is necessary that the controlling-valves of the transfer-cylinder and discharge-gate cylinder be returned to their normal positions as soon as the carrier has been discharged from the receiving-tube. I shall therefore employ what I will term "valve-restoring" mechanism, which may be described as follows:

130 indicates an opening in the bottom of the discharge-chute immediately below the gate and through which projects a finger 131, carried by a shaft 132, journaled in suitable bearings upon the frame below the discharge-chute.

133 indicates a short lever fixed to the shaft 132 and connected by a pitman 134 to the long arm 135 of a bell-crank lever 136, the short arm 137 of which is snubbed and is in operative relation with the free end of the valve-actuating lever 70. The bell-crank lever 136 has a yielding pivotal support consisting of a spring-actuated swinging link 138. 139 indicates a similar spring-actuated link carried upon the valve-chest 79, to which is pivoted a bell-crank lever 140 similar to the bell-crank lever 136 and in operative proximity to the valve-actuating lever 81, the long arm of the bell-crank lever 140 being connected to the shaft 132 by a pitman 141 and short lever 142 similar to the lever 133.

143 indicates a shaft located in a finger-box 144 underneath the slotted thimble 58, and carrying a finger 145 similar to the finger 131, projecting through one of the slots 59 in the thimble into its interior.

146 and 147 indicate short levers upon the extremities of the shafts 143 and 132, respectively, which are connected by a connecting-rod 148.

149 indicates a spring secured at one end by a hook 150, carried by the frame and connected at its opposite end to a hook 151, carried by the lever 146.

It will be apparent that the valve-restoring mechanism of both valves will operate interdependently and that the actuation of either of the fingers 131 or 145 will restore the controlling-valves of both the transfer-frame cylinder and discharge-gate cylinder.

Figure 5:
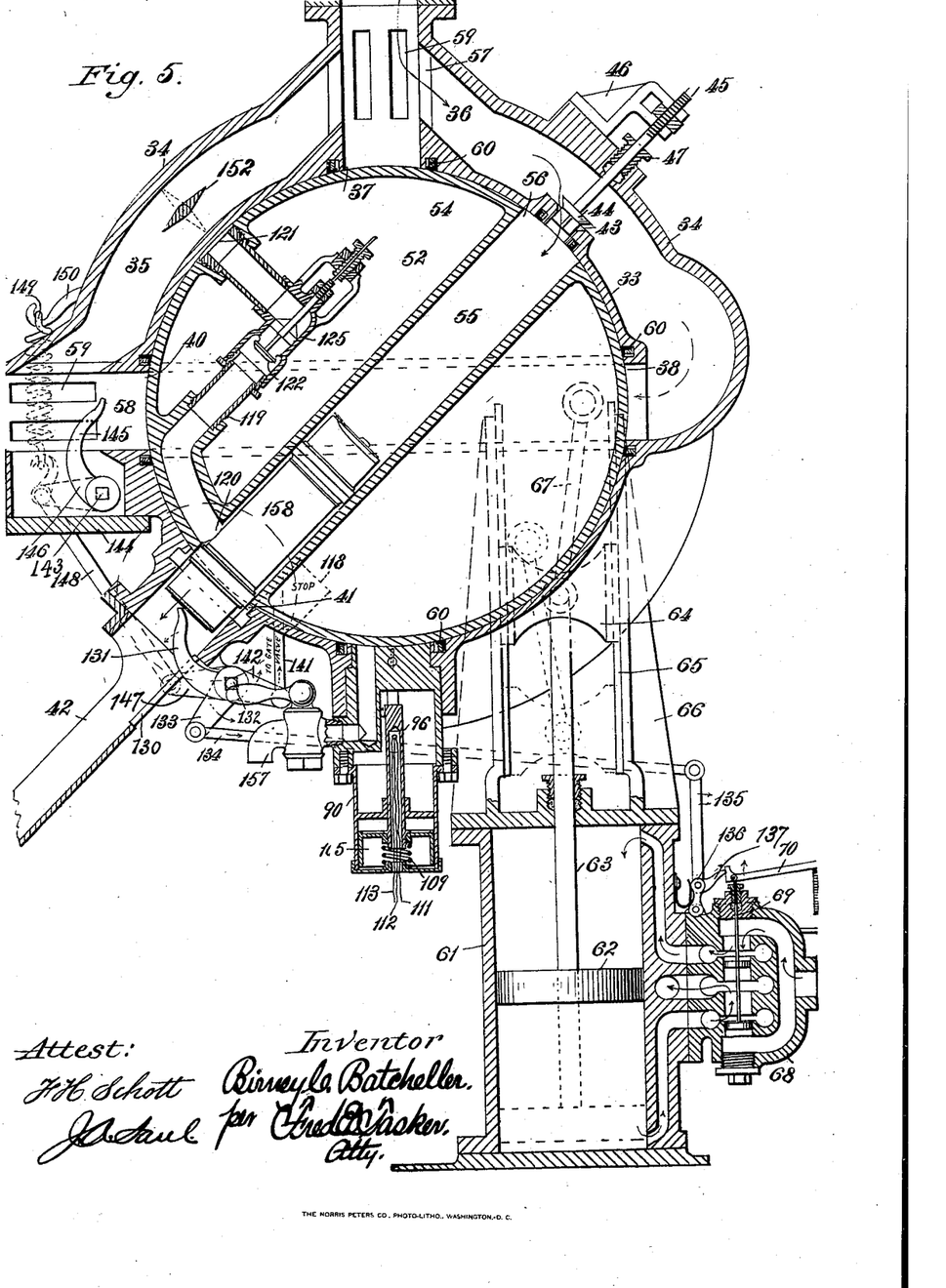
Fig. 5 is a view similar to Fig. 4, the receiving-tube being in the position to discharge the carrier into the discharge-chute.

Supposing the carrier to have been received and the transfer-frame to have been rotated to the position indicated in Fig. 5, the carrier will be discharged in the direction of the arrow and will depress the finger 131 until the progress of the carrier is unimpeded. This movement of the finger will cause a partial rotation of the shaft 132, which through the intermediate levers and connected parts will cause the short arms of the bell-crank levers 136 and 140 to engage the rear edges of the valve-actuating levers 70 and 81. As soon as the carrier has passed, the finger 121 will assume its normal position under the impulse of the spring 149, rotating the shaft 132 and causing the bell-crank levers to be rocked a sufficient distance to restore the levers 70 and 81 and their connected valves to their normal positions.

The purpose of the yielding bell-crank-lever supports is to provide a frictional contact between the snubbed ends of said levers and the ends of the valve-actuating levers, a yielding of the pivotal point being necessary when the snubbed ends are thrown backward to accomplish the engagement.

Figure 2:
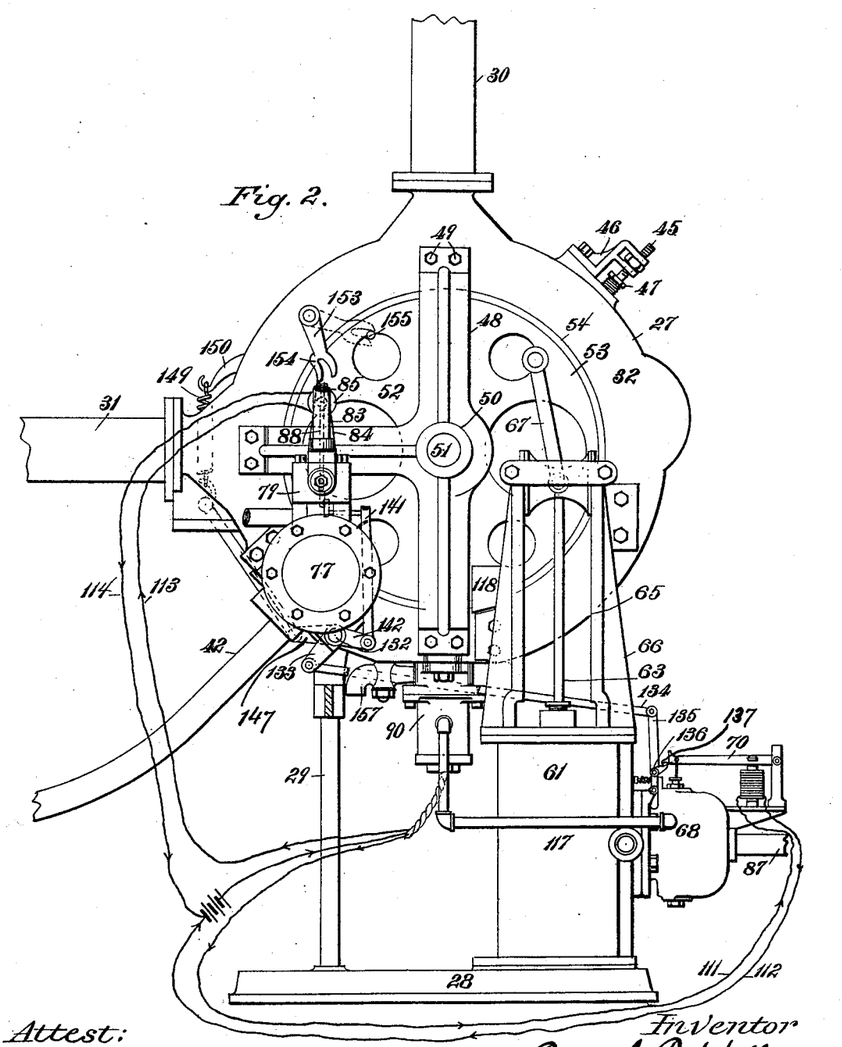
Fig. 2 is a side elevation of the receiving, discharging, and transferring apparatus designed to be located at each station.
Figure 3:
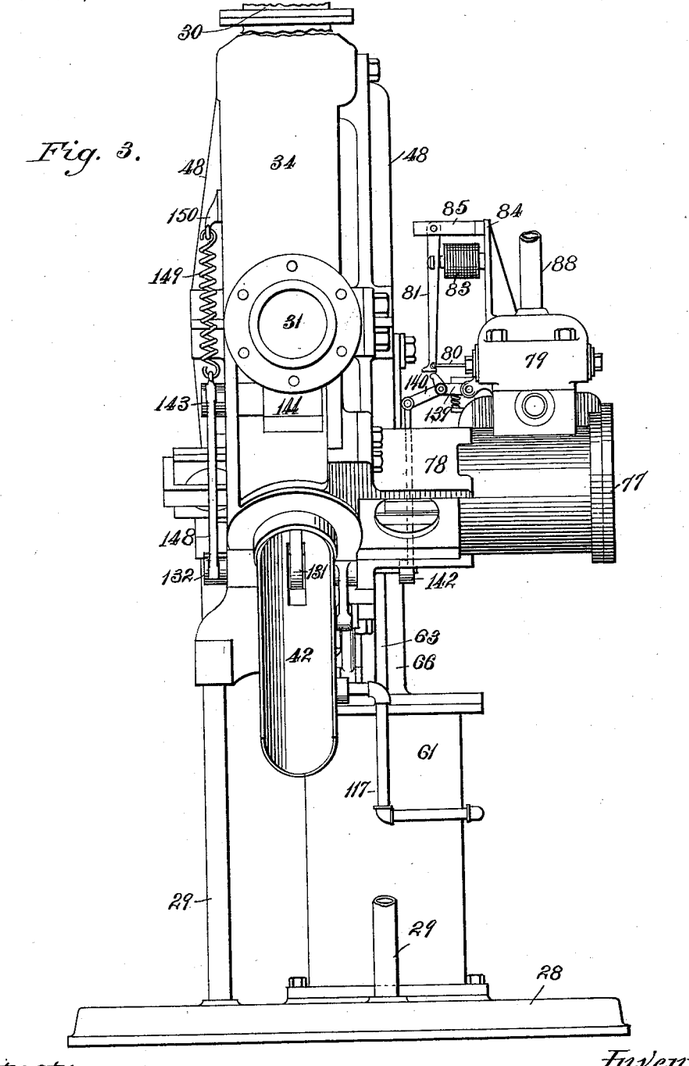
Fig. 3 is an end elevation.

Any tendency of the carrier to stick within the receiving-tube when it is discharged from the tube 30 will be overcome by the air-pressure behind it, which will be in excess of the pressure in front of the carrier. This reduction of pressure in the lower end of the receiving-tube is accomplished by the rapid escape of air through the escape-pipe, due to the blast of air through the air-passage 35, which upon the principle of the air-injector creates a vortex at the discharge end of the escape-tube 119. This action is not sufficient to prevent the formation of the air-cushion under the carrier, but is sufficient to cause the reduction of pressure below the direct pressure in the tube 30 when the carrier from any cause sticks within the receiving-tube during its descent. Provision must also be made for directing the whole air-blast through the air-passage 36 into the receiving-tube when the latter is in the position indicated in dotted lines in Fig. 5. For this purpose I provide a rotary butterfly-valve 152, located in the passage 35 and having secured to its shaft upon the exterior of the casing an arm 153, Fig. 2, the end of which is bifurcated at 154 for the reception of a pin 155, carried by the transfer-frame and designed when said frame is rotated to bring the receiving-tube into the horizontal position to engage the arm 153 and swing it to the position indicated by the dotted lines in Fig. 2, thereby closing the valve 152 and directing part or the entire blast from the tube 30, through the air-passage 36 and aperture 38, into the receiving-tube behind the carrier to project the latter through the aperture 40 into the tube 31.

A suitable sending apparatus is indicated at 156; but as it forms no part of my invention is not considered in detail and is only indicated in the drawings.

Any suitable means for draining the receiving-tube may be provided—as, for instance, a cock 157, as shown.

I have now completed a description of the receiving, discharging, and transferring apparatus located at each station in the system or in the several connected systems, the distance between the contact-needles in each apparatus being different, as heretofore remarked, and I shall now proceed to a description of my improved carrier, the mechanism carried by which may be so adjusted that contact may be made between the needles of any particular station upon the arrival at that point of the carrier, the needle 101 being invariably depressed by the arrival of any carrier at any station, as it has been seen that the depression of said needle causes the rotation of the transfer-frame, which operation must take place whether the carrier is to be discharged or transferred.

In Fig. 7 I have illustrated a carrier in which figure 158 indicates a cylindrical body part carrying packing-rings 159 and a cap 160 at its rear end. At the opposite end of the carrier is a concave or disk-shaped end piece 161, filled with felt or similar material 162, superimposed upon which and closing the end of the carrier is a leather or similar disk 163, held in place by a metallic washer 164 upon a bolt 165, passing through the disk 163, felt 162, and concave end piece 161, being secured in place by a nut 166, screwed upon its extremity behind the end piece. The bolt 165 is provided with a screw-threaded internal bore 167 for the reception of the screw-threaded shank 168 of the contact-disk 169, the contact-disk being by this means capable of ready adjustment to or detachment from the carrier.

170 indicates an insulating-disk of leather or the like interposed between the contact-disk 169 and the washer 164.

The parts just enumerated constitute the head of the carrier. (See also Figs. 8 and 9.)

In Fig. 10 I have illustrated a group of contact-disks of varying sizes. Supposing that it is desired to send a carrier from the central station (see Fig. 1) to the station 7, located upon the loop-circuit 11, the largest contact-disk is placed upon the head of the carrier, the contact-needles at the first station reached, which is station 7, being farther apart than the needles of any other station upon the circuit. When, therefore, the carrier reaches station 7, the contact-disk upon its head will not only depress the needle controlling the transfer-circuit, but will form a contact between the two needles, thereby closing both the transfer and discharge circuits and automatically causing the carrier to be discharged in the manner hereinbefore explained. If it is desired to discharge the carrier at station 8, the next smaller size of contact-disk is screwed upon the head of the carrier, and the diameter of such disk being insufficient to span the distance between the two needles at station 7 the arrival of the carrier at that station will not form contact between the needles 101 and 101$^a$, but will, through the depression of the needle 101, close the transfer-circuit, and the transfer apparatus will be set in motion and the carrier transferred to the tube in the direction of station 8, the needles of which latter station being closer together than the needles at station 7 the contact-disk will form a contact between both needles, closing both circuits and causing the carrier to be discharged.

The needles of the stations beyond the central station are successively closer together, so that the smallest disk, for instance, will not close the discharge-circuit of any station other than the station 10, but will close the transfer-circuit at each preceding station, thereby causing its transfer from one part of the circuit to the tube beyond until it finally reaches its destination, where both circuits will be closed and the carrier discharged in the manner described.

It is evident that when a carrier is discharged at any particular station its disk may be replaced by the disk corresponding to another station, and the carrier may then be resent, its automatic discharge at its proper destination being determined by the size of the disk screwed upon its head.

Figure 16:
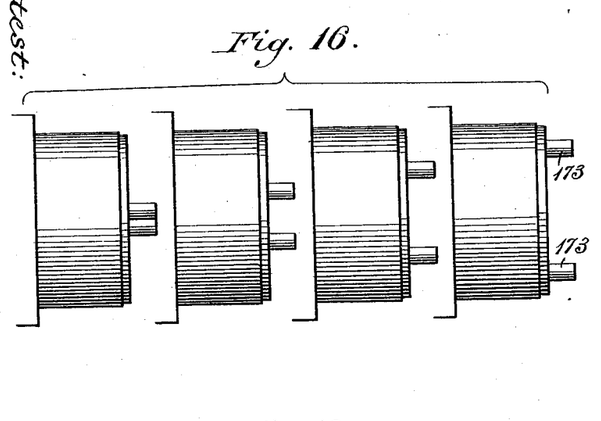
Fig. 16 is a group illustrating a modified form of carrier-head.
Figure 17:
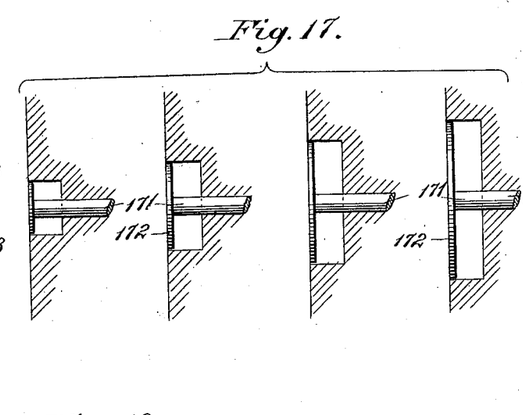
Fig. 17 is a corresponding group of valve stems and disks designed to coöperate with the heads illustrated in Fig. 16.

While perhaps the detachable contact-disk is the preferable form of contact or valve-tripping mechanism, it is obvious that the desired result may be accomplished in a variety of ways. For instance, instead of such a disk a pair of adjustable contact-pins might be provided upon the head of the carrier, it simply being necessary in this event to adjust one of said pins toward or from the other. It might also be preferable in some instances to operate the valve-stems of the transfer-frame cylinder and discharge-cylinder valves by mechanical connection instead of electrically in the present embodiment of my invention. Such modification is shown in Figs. 16 and 17, in which the valve-stem 171 or a stem connected therewith through suitable intervening mechanism is provided with disks 172 of varying diameters, the head of the carrier being provided with a pair of adjustable lugs 173, which may be adjusted so as to impinge against any one of the disks 172, the diameters of which vary at each station in a manner corresponding to the variance of the distance between the needles in my previously-described apparatus.

Figure 18:
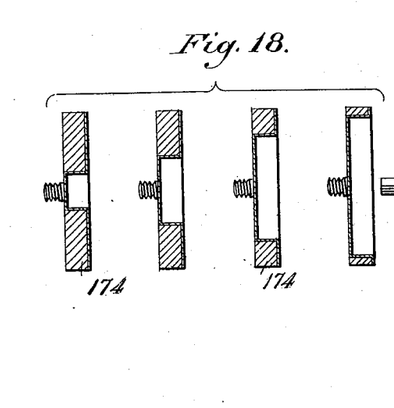
Fig. 18 is a group of a modified form of detachable disks for the carrier-heads.
Figure 19:
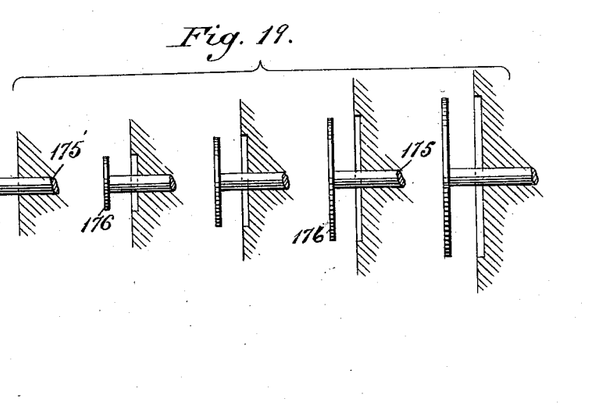
Fig. 19 is a group of corresponding valve-stems and disks designed to coöperate with the disks illustrated in Fig. 18.

A still further modification is shown in Figs. 18 and 19, recessed detachable disks 174, designed to be screwed upon the carrier, being shown in Fig. 18, and valve-stems 175, provided with graduated disks 176, being shown in Fig. 19. The principle of this modification is substantially the same as in the modification shown in the preceding figures, the disk 174 having the recess of largest diameter failing to depress any of the disks 176 except the largest, the smaller disks passing into the recess instead of being depressed.

Figure 15:
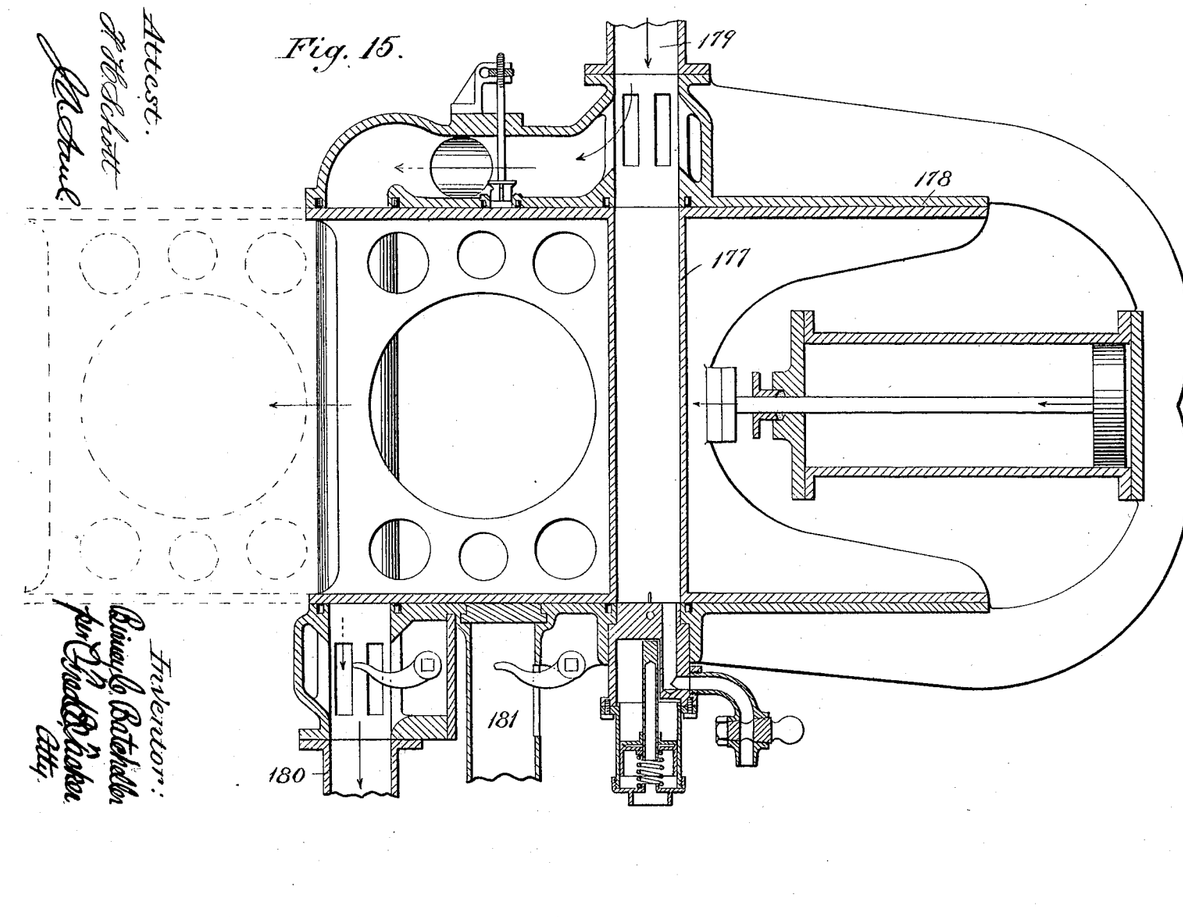
Fig. 15 is a sectional view of a modified form of receiving, discharging, and transferring apparatus.

It is also evident that instead of having a rotatory receiving-tube it may be moved laterally, as shown in the modification illustrated in Fig. 15, in which figure the transfer-frame 177 slides in suitable bearings 178 in the frame of the apparatus, the system tubes 179 and 180 being in different vertical planes and the discharge-chute 181 being located in an intermediate plane, as illustrated. The principle of operation is substantially the same in this modification as in the original preferred form of my apparatus.

Briefly, the operation of my device is as follows: The apparatus being in the position indicated in Fig. 4, the carrier provided with a contact-disk of sufficient diameter to form a contact between the needles 101 and 101ª is discharged from the tube 30 into the receiving-tube 55. The air within the receiving-tube is compressed by the descent of the carrier and forms a cushion, which is gradually dissipated through the escape-pipe 119. The carrier being thus gradually brought to rest forms an electrical contact between the needles and simultaneously depresses them. The transfer and discharge circuits being closed cause the magnetization of the magnets 72 and 83, causing the attraction of the armatures upon the valve-levers 70 and 81 and opening the controlling-valves of the transfer-frame cylinder and discharge-cylinder, respectively. The pistons in said cylinders will now be reciprocated, the discharge-gate will be opened, and the transfer-frame will be rotated until the stop 118 impinges against the discharge-gate, at which time the receiving-tube will be in the position indicated in Fig. 5 and the carrier will be discharged into the chute 42 by the air-pressure behind it admitted to the receiving-tube through the valve-controlled aperture 43. The discharge of the carrier will depress the finger 131, which through the intermediate mechanism will cause the bell-crank levers 136 and 140 to engage the valve-levers 70 and 81. As soon as the carrier has passed beyond the finger 131 the latter will be restored to the normal position under the impulse of the spring 149, causing the bell-crank levers to be swung upon their pivots and the valve-levers 70 and 81 to be restored to their normal positions and causing the discharge-gate to be closed and the transfer-frame to be restored to the position indicated in Fig. 4. If, however, the carrier received is provided with a contact-disk too small to form a contact between the needles, the transfer-circuit only will be closed by the depression of the needle 101, the piston 62 being reciprocated as before and the transfer-frame being rotated to the position indicated by dotted lines in Fig. 5. The pin 155 swinging the arm 153 and closing the valve 152, the entire air-blast from the tube 30 will now be directed through the passage 36 and aperture 38 into the receiving-tube, causing the projection of the carrier through the opening 40 into the tube 31 beyond the apparatus, the controlling-valve of the transfer-cylinder being restored by the depression of the finger 145 in a manner identical with the same operation through the medium of the finger 131 when the carrier was discharged.

I do not limit myself to the details of construction herein shown and described, but reserve to myself the right to change, modify, or vary such construction at will within the scope of my invention.

What I claim is—

1. In a pneumatic-transmission system having a delivery-tube and two or more receiving-tubes or discharge-passages connectible therewith, a device for delivering a carrier coming from the delivery-tube into one of the receiving-tubes or discharge-passages, in combination with mechanism for actuating said device arranged to be set in actuation by a carrier, and means for checking the motion of the carrier in advance of its reaching said actuating mechanism so as to avoid the impingement of the carrier thereon while moving at speed.

2. In a pneumatic-transmission system having a delivery-tube and two or more receiving-tubes or discharge-passages connectible therewith, a device for delivering a carrier coming from the delivery-tube into one of the receiving-tubes or discharge-passages in combination with mechanism for actuating said device arranged to be set in actuation by a carrier, mechanism for governing the motion and arrest of the device for delivering the carrier also operated by the carrier and means for checking the motion of the carrier in advance of its reaching said actuating mechanisms so as to avoid the impingement of the carrier thereon while moving at speed.

3. In a pneumatic-transmission system the combination with a delivery-tube of one or more receiving or discharge passages, a transfer-tube adjustably supported so as to be movable into registry with each tube in turn, automatic means arranged to check and stop a carrier as it is received from the delivery-tube into the transfer-tube and means for moving the transfer-tube into registry with any receiving-tubes or discharge-passage.

4. In a pneumatic-transmission system the combination with a delivery-tube of one or more receiving-tubes or discharge-passages, a transfer-tube adjustably supported so as to be movable into registry with each tube in turn, automatic means arranged to check and stop a carrier as it is received from the delivery-tube into the transfer-tube and automatic means for moving the tranfer-tube into registry with any receiving-tube arranged to be actuated by the entrance of the carrier into said transfer-tube and to be impinged upon by said carrier after its motion is checked.

5. In a pneumatic-transmission system the combination of a delivery and one or more receiving or discharge tubes, of a transfer-apparatus casing into which said tubes lead, a transfer-tube open at both ends and adapted to register in turn with the delivery and receiving tubes but not with two tubes simultaneously said tube moving on the casing aforesaid and having its far end closed thereby when in registry with the delivery-tube, mechanism for moving the transfer-tube into registry with the receiving or discharge tubes and a trip for putting said mechanism into operation arranged to be engaged by a carrier after it has entered the transfer-tube.

6. The combination with conveying-tubes out of line and a discharge-chute, of a receiving and transferring tube movable into line with either of the conveying-tubes or the chute, and stop mechanism designed to stop the receiving and transferring tube opposite the discharge-chute or conveying-tube, substantially as specified.

7. In an apparatus of the character described, the combination with a suitable casing and transfer-frame provided with a receiving-tube, of transfer-frame-actuating mechanism, an electrically-actuated valve controlling said mechanism, a carrier, and means for closing the electric circuit by the movement of the carrier, substantially as specified.

8. In an apparatus of the character described, the combination with a suitable casing, and transfer-frame provided with a receiving-tube, of a discharge-gate and discharge-gate-actuating mechanism, substantially as specified.

9. In an apparatus of the character described, the combination with a suitable casing, a discharge-gate, and valve-controlled mechanism for actuating the discharge-gate, of a transfer-frame provided with a receiving-tube designed to receive a carrier, and valve-actuating mechanism adapted to be brought into operation by a carrier, substantially as specified.

10. In an apparatus of the character described, the combination with a suitable casing, discharge-gate and transfer-frame provided with a receiving-tube, of valve-controlled transfer-frame-actuating mechanism, valve-controlled discharge-gate-actuating mechanism, electrical valve-actuating mechanism for each of said valves, and circuit-closing mechanism operated by the movement of the carrier, substantially as specified.

11. In an apparatus of the character described, the combination with a suitable casing and transfer-frame provided with a receiving-tube designed to receive a carrier, of valve-controlled transfer-frame-actuating mechanism, means for actuating the valve in one direction, and a finger operatively connected to the valve through intermediate mechanism and located in the path of the carrier for actuating the valve in the opposite direction, substantially as specified.

12. The combination with a casing, transfer-frame, discharge-gate, and valve-controlled discharge-gate-actuating mechanism, of means for actuating the valve in one direction, and a finger operatively connected with the valve and located in the path of the carrier, designed to actuate the valve in the opposite direction, substantially as specified.

13. In an apparatus of the character described, the combination with a casing, conveying-tubes, a discharge-gate and a movable transfer-frame, of valve-controlled transfer-frame-actuating mechanism, valve-controlled discharge-gate-actuating mechanism, means for actuating the valves in one direction and interdependent fingers operatively connected with the valves and adapted to actuate the valves in the opposite direction, said fingers being located adjacent to the discharge-gate and to the entrance of the conveying-tube, respectively, substantially as specified.

14. In an apparatus of the character described, the combination with a casing, transfer-frame provided with a receiving-tube, and valve-controlled transfer-frame-actuating mechanism, of a valve-lever provided with an armature, a magnet, a transfer-circuit including said magnet, and a contact-needle designed to be actuated by a carrier to close the transfer-circuit, substantially as specified.

15. In an apparatus of the character described, the combination with a transfer-frame provided with a receiving-tube designed to receive a carrier, of a discharge-gate, electrically-controlled transfer-frame-actuating mechanism, electrically-controlled discharge-gate-actuating mechanism, a transfer-circuit, and a discharge-circuit, and a plurality of movable needles in electrical connection with the circuits, substantially as specified.

16. In an apparatus of the character described the combination with an electric circuit, and a plurality of needles mounted upon a reciprocatory needle-support, and means for reciprocating the same, substantially as specified.

17. In an apparatus of the character described, the combination with an electric circuit, of a plurality of contact-needles, a needle-support, a piston designed to actuate said support, and means for directing fluid-pressure against the piston for actuating it in one direction, substantially as specified.

18. In an apparatus of the character described, the combination with a transfer-frame, and a transfer-frame cylinder provided with a controlling-valve, of a contact-needle, needle-support, a cylinder, a piston within said cylinder designed to actuate the needle-support, and means for admitting fluid within the cylinder by the actuation of the valve controlling the transfer-frame cylinder, substantially as specified.

19. In an apparatus of the character described, the combination with a reciprocatory needle-support, of a plurality of contact-needles yieldingly supported thereby, substantially as specified.

20. In a carrier, the combination with a cylindrical casing, of a concave end piece, a filling of felt or the like, an insulating-disk superimposed upon the felt, an internally and externally threaded bolt piercing the insulating-disk, felt and end piece, the interior bore of the bolt being designed for the reception of the shank of a detachable disk, substantially as specified.

21. A carrier for pneumatic-despatch tubes having on its forward end an insulated plate of electrical conducting material, substantially as described.

22. A carrier for pneumatic-despatch tubes having on its forward end an adjustable insulated plate of electrical conducting material, substantially as described.

23. In a pneumatic-despatch-tube system, a despatch-tube having substations intermediate its terminals, means at each substation for receiving and arresting each carrier passing through the tube, and adjustable selecting devices on the carriers and in the receiving and arresting apparatus whereby the carrier may be automatically ejected or continued in its journey substantially as described.

24. In a system of pneumatic transmission, apparatus at each station arresting each carrier in its flight, devices operating in connection with said arresting apparatus and causing it to eject or forward the carrier, and selecting means automatically actuated by the carrier when arrested to determine the ejecting or forwarding action of the arresting apparatus substantially as described.

25. In a pneumatic-despatch-tube system, a despatch-tube, intermediate carrier receiving and transferring apparatus operating to arrest each carrier in its flight, air-cushions in said carrier receiving and transferring apparatus, and valve-actuating mechanism controlling the operation of said carrier receiving and transferring apparatus and set in operation by the arrested carrier substantially as described.

26. The combination of pneumatic-despatch tubes, carrier receiving and arresting apparatus located at intermediate stations on said tubes and automatically operating selecting devices actuated by the arrested carriers, whereby the carriers intended for a station are ejected at that station and the others returned to the tube and forwarded to the next station substantially as described.

In testimony whereof I affix my signature in presence of two witnesses.

BIRNEY C. BATCHELLER.

Witnesses:
JUSTIN BATCHELLER,
FRED C. SPENCER.